United States Patent
Keitsch et al.

(10) Patent No.: US 12,451,496 B2
(45) Date of Patent: Oct. 21, 2025

(54) BIPOLAR PLATE AND FUEL CELL STACK

(71) Applicant: AUDI AG, Ingolstadt (DE)

(72) Inventors: Oliver Keitsch, Heilbronn (DE);
Sebastian Voigt, Heilbronn (DE);
Fabian Lippl, Mannheim (DE); Armin
Siebel, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 490 days.

(21) Appl. No.: 18/002,238

(22) PCT Filed: May 21, 2021

(86) PCT No.: PCT/EP2021/063604
§ 371 (c)(1),
(2) Date: Dec. 16, 2022

(87) PCT Pub. No.: WO2021/259568
PCT Pub. Date: Dec. 30, 2021

(65) Prior Publication Data
US 2023/0317971 A1  Oct. 5, 2023

(30) Foreign Application Priority Data

Jun. 26, 2020  (DE) .................. 10 2020 116 848

(51) Int. Cl.
H01M 8/0206 (2016.01)
H01M 8/0258 (2016.01)
H01M 8/0267 (2016.01)
H01M 8/241 (2016.01)

(52) U.S. Cl.
CPC ....... *H01M 8/0206* (2013.01); *H01M 8/0258* (2013.01); *H01M 8/0267* (2013.01); *H01M 8/241* (2013.01)

(58) Field of Classification Search
CPC ............ H01M 8/0206; H01M 8/0258; H01M 8/0267; H01M 8/241; H01M 8/0202; H01M 2008/1095; Y02E 60/50
See application file for complete search history.

(56) References Cited

U.S. PATENT DOCUMENTS

2005/0142414 A1  6/2005  Kimura et al.

FOREIGN PATENT DOCUMENTS

| DE | 10015360 A1 | 10/2001 |
| DE | 10203612 C1 | 6/2003 |
| DE | 102013011422 A1 | 4/2014 |
| DE | 102013011412 A1 | 1/2015 |
| EP | 1826850 A2 | 8/2007 |
| FR | 2899386 A1 | 10/2007 |

OTHER PUBLICATIONS

International Search Report, mailed Sep. 13, 2021, for International Patent Application No. PCT/EP2021/063604. (2 pages).
Written Opinion of the International Searching Authority, mailed Sep. 13, 2021, for International Patent Application No. PCT/EP2021/063604. (7 pages).

*Primary Examiner* — Helen Oi K Conley
(74) *Attorney, Agent, or Firm* — Seed Intellectual Property Law Group LLP

(57) ABSTRACT

A bipolar plate comprises a passive plate portion having a plurality of media ports and an active plate portion serving for the distribution of the reactants, wherein the passive plate portion and the active plate portion are coupled to each other by means of at least one spring element. A fuel cell stack comprising such a bipolar plate is also provided.

9 Claims, 4 Drawing Sheets

State of the art

State of the art

BIPOLAR PLATE AND FUEL CELL STACK

BACKGROUND

Technical Field

Embodiments of the invention relate to a bipolar plate comprising a passive plate portion having a plurality of media ports and an active plate portion serving for the distribution of the reactants. Embodiments of the invention further relate to a fuel cell stack.

Description of the Related Art

Fuel cells are used to provide electrical energy by means of an electrochemical reaction, wherein a plurality of fuel cells can be connected in series to form a fuel cell stack to increase the usable power. Each of the fuel cells comprises an anode, a cathode as well as a proton-conducting membrane separating the anode from the cathode, which is coated with a catalyst to promote the electrochemical reaction.

Reactant gases are supplied to the electrodes of the fuel cells by means of bipolar plates, which is to say, hydrogen on the anode side and oxygen or an oxygen-containing gas, in particular air, on the cathode side. When the reactants are supplied to the fuel cell, the reactants are fed via media ports into the bipolar plate, which through the use of one channel or a plurality of channels bring about a distribution of the reactants into an active area, this in order to supply the entire surface of the electrodes as uniformly as possible by means of a flow field. In addition to the reactant gases, a coolant is also passed through the bipolar plate, so that three different media must be conducted through the smallest possible space while remaining technically closely separated. For this reason, two metallic formed parts are usually welded to form a bipolar plate. Furthermore, gas diffusion layers are used to distribute the reactants fed into the bipolar plates as evenly as possible over the entire surface of the membrane coated with the catalyst.

This plurality of fuel cells combined in a fuel cell stack is generally compressed with the aid of tension elements of a tensioning system with a force in the magnitude of several tons in order to achieve sufficient contact pressure on the catalyst-coated membrane for a reduction of ohmic losses and to prevent leakage of the deployed seals by means of the high compression.

It should, however, be noted that forces occur during operation of the fuel cell stack that can lead to an increase or reduction in the compression force. The increase in the compression force is caused by thermal expansion of the components used, by the pressure used for feeding and distributing the reactants, and by swelling of the membrane used during its hydration.

A reduction of the compression force can be caused by a negative thermal expansion in the case of dropping or low temperatures or by the settling behavior of the gas diffusion layers, which increases with increasing service life and thus age of the fuel cell stack. It is therefore necessary to compensate for the settling behavior over the entire service life of the fuel cell stack, for which purpose spring elements such as disk springs or coil springs are applied to the tensioning system, which, however, requires additional installation space, increases the weight of the fuel cell stack and increases the costs and the developmental efforts. It is also necessary to evenly distribute the clamping force over the surface of the fuel cell stack, which usually requires an additional element between the clamping system and the spring elements.

DE 10 2013 011 412 A1 discloses a bipolar plate with a cathode plate and an anode plate, wherein the cathode plate has a spring region which is elastically deformable in the vertical direction of the bipolar plate and to which a seal is injection molded. DE 10 2013 011 422 A1 discloses a bipolar plate in which both the cathode plate and the anode plate have a region which is substantially elastically deformable in the vertical direction, and which is provided with a reinforcing structure. FR 2899386 A1 discloses half-plates of a bipolar plate provided with ribs, on which ribs electrically conductive, elastic conductive components are supported to ensure electrical contact.

BRIEF SUMMARY

Some embodiments provide an improved bipolar plate and an improved fuel cell stack.

In the bipolar plate, in some embodiments, with a passive plate portion having a plurality of media ports and an active plate portion serving to distribute the reactants, the passive plate portion and the active plate portion are coupled to one another by means of at least one spring element. This results in the advantage that the spring function is integrated into the bipolar plate and additional springs or spring elements, and the space required for them can be dispensed with. There is thus a shifting of the spring function from the clamping system encompassing the fuel cell stack to the fuel cell with its bipolar plate, wherein the spring function is assigned to specific areas of the bipolar plate, namely between the passive plate portion and the active plate portion, wherein the passive plate portion circumferentially encompasses the active plate portion having a flow field. It should be noted that the passive plate portion has a media-carrying, sealing and insulating function, whereas the active plate portion has the flow field and is exposed to the settling behavior, in particular of the gas diffusion layers, and is held in secure contact with the gas diffusion layers by means of the spring element.

A cathode plate and an anode plate may be combined and the at least one spring element may be formed by a leaf spring arranged between the passive subplate and the active subplate and formed by subsections of the cathode plate and the anode plate, in particular, if the cathode plate and the anode plate are formed from a metal or a metal alloy. Due to the principally two-part construction with a sheet-like area and the use of a sufficiently elastic material, it is possible to implement the leaf spring principle without further components, wherein the spring constant of the leaf spring can be adjusted by a frictional engagement between the subsections of the cathode plate and the anode plate, which is to say, the force flow between the metal layers can be modified, for example, by different welds or an adapted roughness of the surfaces.

Alternatively or even additionally, the spring constant of the leaf spring can be adjusted by an increased frictional force between the subsections of the cathode plate and the anode plate.

Furthermore, there is the possibility that the spring constant of the leaf spring is adjusted by an intermediate element arranged between the subsections of the cathode plate and the anode plate.

In particular, if the bipolar plate is not formed of metal, but rather is implemented as a graphite compound bipolar plate, the subsections may be at least partially substituted by an elastic element which is connected to the passive plate portion and the active plate portion by injection molding or vulcanization. In this, the setting of the spring properties can constructively occur by means of an adjustment of the moment of inertia to bending or by an adjustment of the material properties.

Since the media must be conducted and distributed, without change, using the media ports, from the passive plate portion to the bipolar plate, it is provided that channels are formed in the elastic element for conducting media between the media ports, wherein these channels may be used for the coolant, since the reactant gases can also be conducted through a suitable gas diffusion layer to the active subplate.

It is also possible that two media ports serving to conduct a coolant are arranged in the passive plate portion, of which one coolant channel is conducted through the subsection, which is to say, in particular, the intermediate element can only partially act as substitute for the coolant channel in the non-substituted areas, or the intermediate element can itself have the coolant channel.

The above-mentioned advantages and effects also apply mutatis mutandis to a fuel cell stack with at least one such bipolar plate and to a fuel cell device or a fuel cell vehicle with such a fuel cell stack.

The features and combinations of features mentioned above in the description, as well as the features and combinations of features mentioned below in the description of the figures and/or shown alone in the figures can be used not only in the respective combination indicated, but also in other combinations or on their own. Thus, embodiments are also to be regarded as encompassed and disclosed which are not explicitly shown or explained in the figures, but which arise from the embodiments that are discussed and can be generated by means of separate combinations of features.

BRIEF DESCRIPTION OF THE SEVERAL VIEWS OF THE DRAWINGS

Further advantages, features and details will be apparent from the claims, the following description of embodiments, and from the drawings.

DETAILED DESCRIPTION

Figure 8:
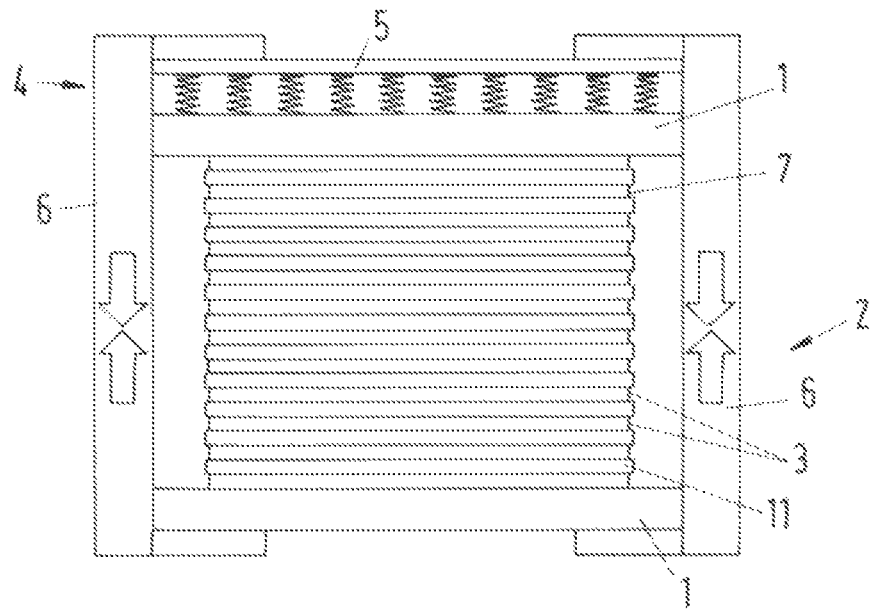
FIG. 8 shows a schematic representation of a prior art fuel cell stack clamped between two end plates, wherein one of the end plates is braced by spring elements against a spring cap.
Figure 9:
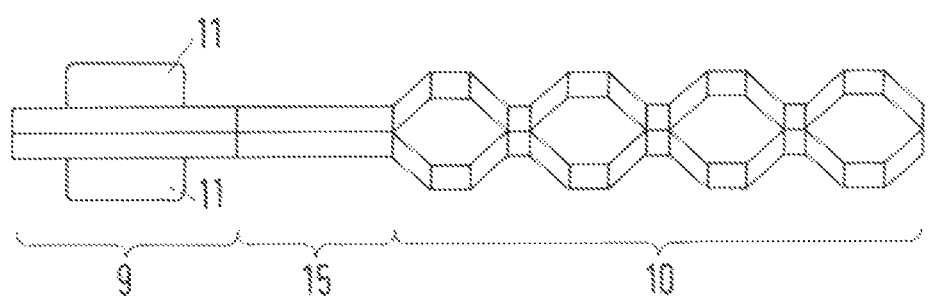
FIG. 9 shows an illustration corresponding to FIG. 2 of a bipolar plate known in the prior art, in which the passive plate portion and the active plate portion are connected to each other without a spring element in the subsection.

FIG. 8 schematically shows a fuel cell stack 2 consisting of a plurality of fuel cells 3 connected in series. Each of the fuel cells 3 comprises an anode and a cathode, as well as a proton-conducting membrane separating the anode from the cathode. The membrane is formed from an ionomer, such as a sulfonated tetrafluoroethylene polymer (PTFE) or a perfluorinated sulfonic acid (PFSA) polymer. Alternatively, the membrane may be formed as a sulfonated hydrocarbon membrane. A catalyst may additionally be admixed to the anodes and/or the cathodes, the membranes being coated on their first side and/or on their second side with a catalyst layer of a noble metal or of mixtures comprising noble metals such as platinum, palladium, ruthenium or the like, which serve as reaction accelerators in the reaction of the respective fuel cell.

Fuel (for example hydrogen) is supplied to the anodes as anode gas via anode spaces within the fuel cell stack 2. In a polymer electrolyte membrane fuel cell (PEM fuel cell), fuel or fuel molecules are split into protons and electrons at the anode. The membrane allows the protons (e.g., $H^+$) to pass through but is impermeable to the electrons ($e^-$). The following reaction takes place at the anode: $2H_2 \rightarrow 4H^+ + 4^-$ (oxidation/electron release). Whereas the protons pass through the membrane to the cathode, the electrons are conducted to the cathode or to an energy storage device via an external circuit. Cathode gas (for example, oxygen or oxygen-containing air) can be supplied to the cathodes by means of cathode compartments within the fuel cell stack 2, so that the following reaction takes place on the cathode side: $O_2 + 4H^+ + 4e^- \rightarrow 2H_2O$ (reduction/electron capture).

The reactant gases are transferred to bipolar plates 7, in which canals are formed and combined into a flow field for distribution of the reactant gases to the membrane. In addition, the bipolar plates 7 are provided for the passage of a coolant, so that three different media are conveyed in a minimum of space.

Figure 1:
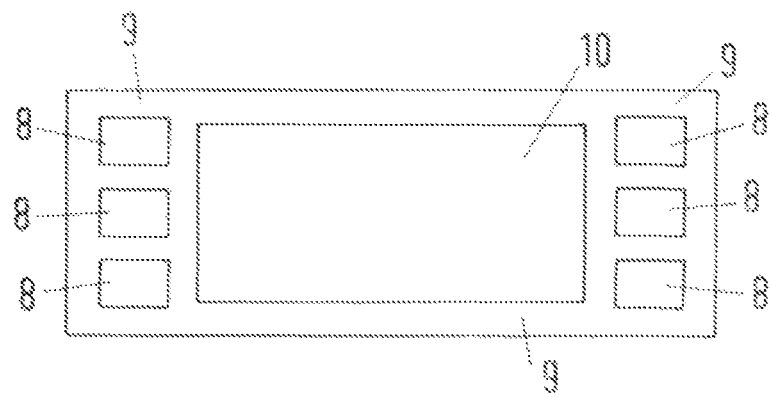
FIG. 1 shows a top view of a schematic representation of a bipolar plate with the passive plate portion having media ports and the active plate portion having a flow field.

In this, FIG. 1 shows a typical disposition of the bipolar plate 7 with a passive plate portion 9 having a plurality of media ports 8 and an active plate portion 10 serving to distribute the reactants, wherein the passive plate portion 9 comprises the active plate portion 10 having a flow field in the circumferential direction. In the passive plate portion 9, three media port pairs are shown at the edge of the flow field in the embodiment example shown, namely two media ports 8 for the supply and discharge of the coolant and two media ports each for the supply and discharge of the two reactant gases. Seals 11 are also assigned to the passive plate portion so that the passive plate portion 9 can perform its sealing, isolating and media-carrying functions.

The fuel cell stack 2 shown schematically in FIG. 8, which is known from prior art, has a plurality of fuel cells 3 arranged between two end plates 1. In the embodiment example shown, the upper end plate 1 is associated with a spring assembly 4, which braces the end plate 1 with respect to a spring cap 5, two tension belts 6 run laterally on the fuel cell stack 2 from the spring cap 5 via the first end plate 1 to the second end plate 1, such that the fuel cells 3 in the fuel cell stack 2 are tensioned with a tensioning force.

Figure 3:
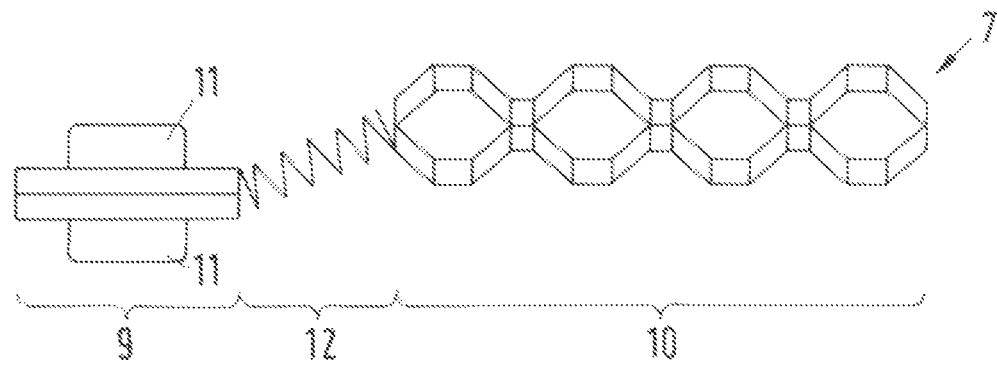
FIG. 3 shows a representation corresponding to FIG. 2 with the untensioned spring element shown in stylized form.
Figure 4:
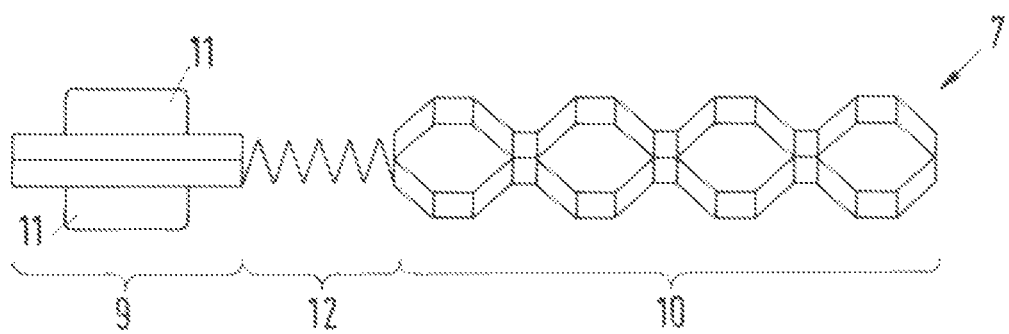
FIG. 4 shows a representation corresponding to FIG. 3 with the tensioned spring element.

In some embodiments, the spring assembly 4 together with the spring cap 5 can be dispensed with by integrating the spring function into at least one of the bipolar plates 7, or into all bipolar plates 7 of a fuel cell stack 2, this by coupling the passive plate portion 9 and the active plate portion 10 by means of at least one spring element 12, as shown schematically in FIG. 3 with a symbolized spring for the untensioned state, which, during assembly of the fuel cell stack 2, changes to the tensioned state shown in FIG. 4, which offers a sufficient re-tensioning reserve to compensate, for example, for settling behavior.

Figure 2:
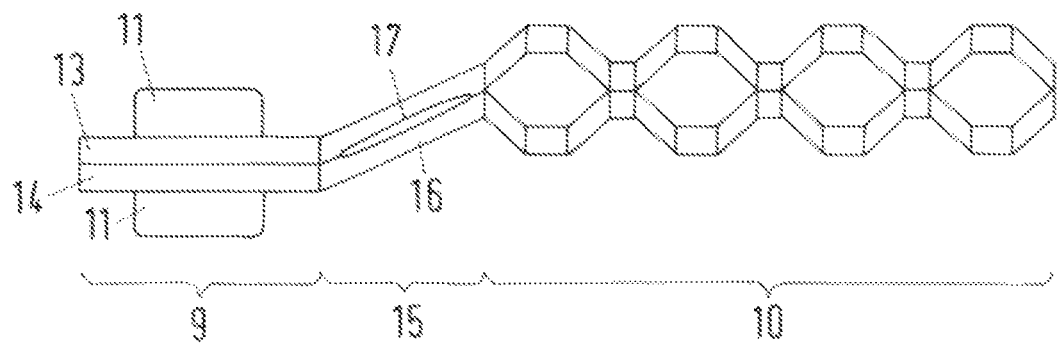
FIG. 2 shows a schematic representation of a longitudinal cross-section through a bipolar plate, wherein the passive plate portion and the active plate portion are coupled to each other by means of a spring element.

The spring element 12 according to FIG. 2 is implemented by combining a cathode plate 13 and an anode plate 14, and the spring element 12 is formed by a leaf spring 16 arranged between the passive subplate 9 and the active subplate 10 and formed by subsections 15 of the cathode plate 13 and the anode plate 14, which is to say due to the two-piece construction of the bipolar plate 7, it is possible to implement the leaf spring principle with an integrated, one-piece leaf spring 16, in particular, with a metallic bipolar plate 7.

Figure 5:
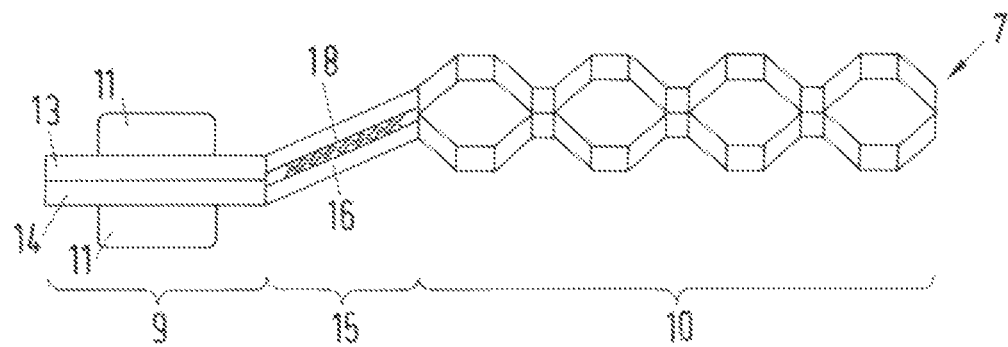
FIG. 5 shows a representation corresponding to FIG. 2 with symbolized frictional force.

The spring constant of the leaf spring 16 can be adjusted by a frictional engagement 17 between the subsections 15 of the cathode plate 13 and the anode plate 14 according to FIG. 2 or by an increased frictional force 18 between the subsections of the cathode plate 13 and the anode plate 14 according to FIG. 5.

Figure 6:
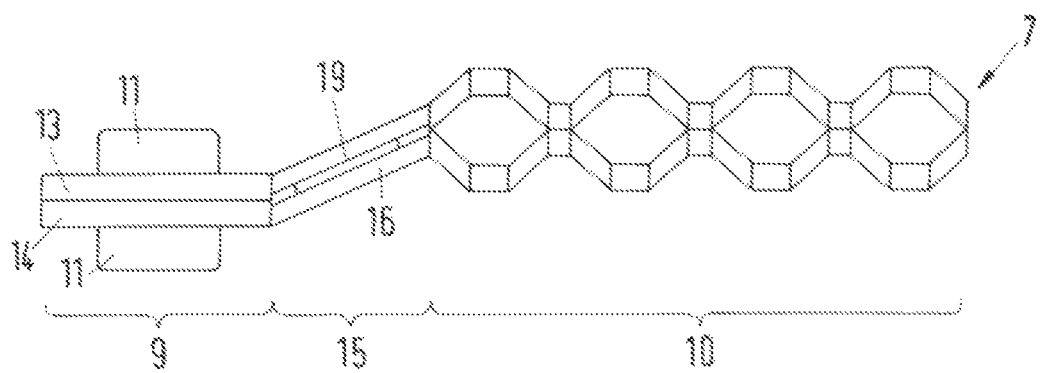
FIG. 6 shows a representation corresponding to FIG. 2 with an intermediate element.

Alternatively, there is also the possibility shown in FIG. 6, whereby the spring constant of the leaf spring 16 can be set by an intermediate element 19 arranged between the subsections 15 of the cathode plate 13 and the anode plate 14.

Figure 7:
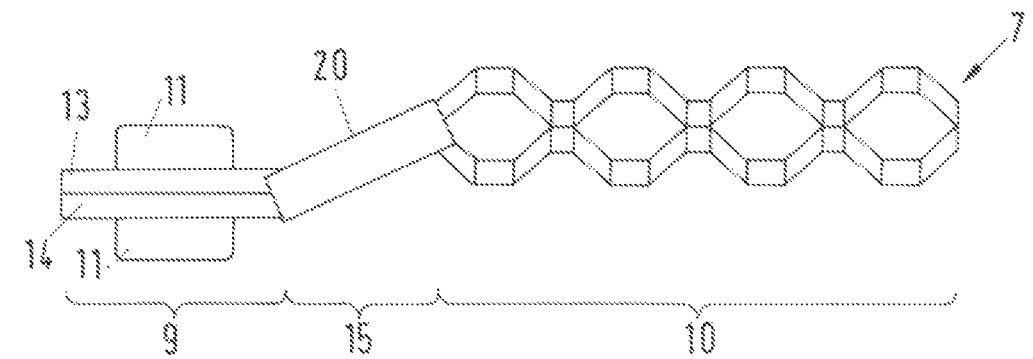
FIG. 7 shows a representation corresponding to FIG. 2 with a subsection substituted by an elastic element.

Lastly, FIG. 7 refers to the possibility that the subsections 15 are at least partially substituted by an elastic element 20, which is connected by injection molding or vulcanization to the passive plate portion 9 and the active plate portion 10, wherein channels for conducting media, in particular the coolant, between the media ports 8 are formed in the elastic element 20. The reactant gases can be conducted via an enlarged gas diffusion layer.

In the embodiments according to FIG. 2, FIG. 5 and FIG. 6, the channel for the coolant can be dispensed with from the design of the subsection 15 as a leaf spring 16, wherein the channel size and shape can be used to adjust the spring properties.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate, comprising:
   a passive plate portion having a plurality of media ports, and
   an active plate portion for distribution of reactants,
   wherein the passive plate portion and the active plate portion are coupled to each other by at least one spring element, and
   wherein a cathode plate and an anode plate are combined and the at least one spring element is formed by a leaf spring arranged between the passive plate portion and the active plate portion and formed by subsections of the cathode plate and the anode plate.

2. The bipolar plate according to claim 1, wherein a spring constant of the leaf spring is adjusted by a frictional engagement between the subsections of the cathode plate and the anode plate.

3. The bipolar plate according to claim 1, wherein a spring constant of the leaf spring is adjusted by an increased frictional force between the subsections of the cathode plate and the anode plate.

4. The bipolar plate according to claim 3, wherein the spring constant of the leaf spring is adjusted by an intermediate element arranged between the subsections of the cathode plate and the anode plate.

5. The bipolar plate according to claim 1, wherein the cathode plate and the anode plate are formed from a metal or metal alloy.

6. The bipolar plate according to claim 1, wherein the subsections include an elastic element which is connected to the passive plate portion and the active plate portion by injection molding or vulcanization.

7. The bipolar plate according to claim 6, wherein channels are formed in the elastic element for conducting media between the media ports.

8. The bipolar plate according to claim 1, wherein two media ports serving to conduct a coolant are arranged in the passive plate portion, of which one coolant channel is conducted through the subsection.

9. A fuel cell stack comprising at least one bipolar plate according to claim 1.

* * * * *